United States Patent [19]

Bolton

[11] 4,379,058

[45] Apr. 5, 1983

[54] METHOD AND APPARATUS FOR FILTERING CONTAMINATING PARTICLES FROM A LIQUID/PARTICLE MIXTURE

[75] Inventor: Joseph A. Bolton, Glens Falls, N.Y.

[73] Assignee: Albany International Corp., Menands, N.Y.

[21] Appl. No.: 263,368

[22] Filed: May 14, 1981

[51] Int. Cl.³ .............................................. B01D 41/04
[52] U.S. Cl. ..................................... 210/791; 162/55; 210/171; 210/409; 210/415; 210/443; 210/451
[58] Field of Search .................. 162/55; 210/767, 791, 210/800, 295, 332, 358, 406, 409, 413–415, 435, 443, 444, 451, 452, 171; 209/273, 380

[56] References Cited

U.S. PATENT DOCUMENTS

| | | | |
|---|---|---|---|
| 1,525,449 | 2/1925 | Johnson | 210/415 |
| 1,990,992 | 2/1935 | Lang et al. | 210/414 |
| 2,125,532 | 8/1938 | Wells | 210/414 |
| 3,221,886 | 12/1965 | Lamort | 210/415 |
| 4,085,050 | 4/1978 | Gervasi | 210/414 |

FOREIGN PATENT DOCUMENTS

| | | | |
|---|---|---|---|
| 1236003 | 6/1960 | France | 210/413 |
| 22869 | of 1914 | United Kingdom | 210/414 |

*Primary Examiner*—Peter A. Hruskoci

*Attorney, Agent, or Firm*—Kane, Dalsimer, Kane, Sullivan & Kurucz

[57] ABSTRACT

A method and apparatus for filtering contaminating particles from a liquid/particle mixture. A hollow tank is provided having a peripheral side wall and top and bottom ends. An inlet opening is in the wall adjacent the top adapted to be connected to a source of the liquid/particle mixture. An outlet opening is in the side wall spaced from the inlet opening and intermediate the top and bottom of the tank. A sealable drainage opening is at the lower end of the tank. A filter is mounted in the tank essentially perpendicular to the inlet opening and around a substantial portion of the periphery of the tank. The mounted filter is open at both ends and has filtering apertures in its side. The inlet opening is positioned so that the mixture is introduced in one open end of the filter. Filtered liquid from the mixture passes through the apertures in the side and through the outlet opening and collected portions can be dumped from the outer end through the drainage opening when it is unsealed. The tank and the filter dimensions are predetermined so that the mixture from the fluid source passes through the inlet opening and into contact with the filter with a desired velocity and the separation of the liquid and particles in the tank is efficiently accomplished without significant clogging of the filter apertures by particles during the filtering operation.

14 Claims, 4 Drawing Figures

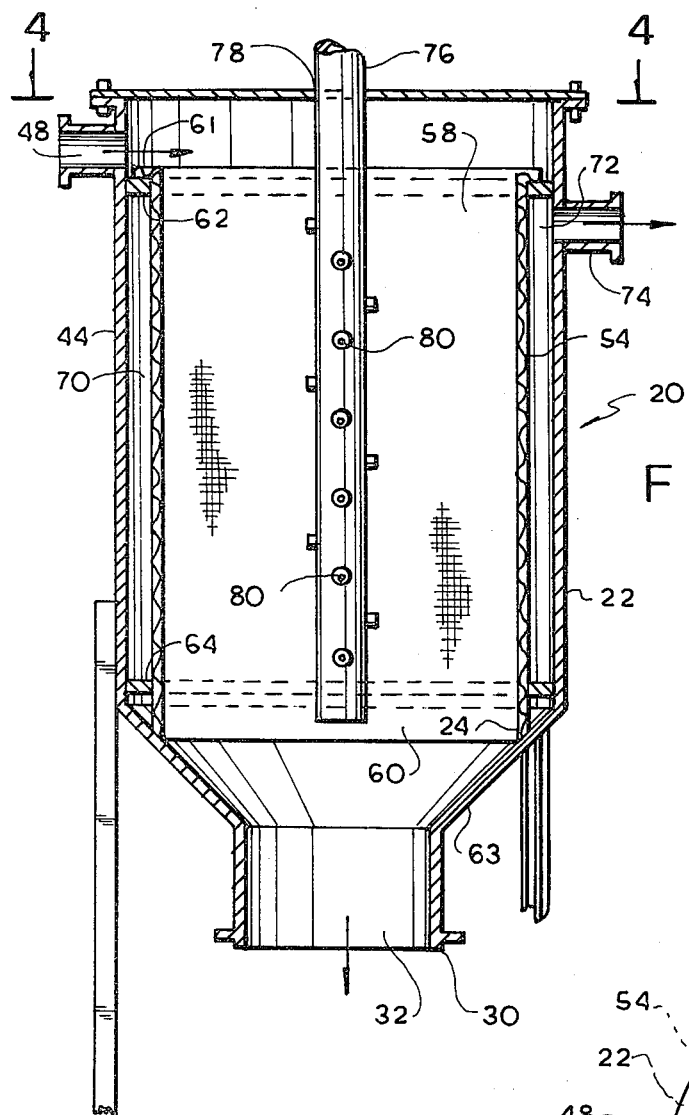
FIG. 2
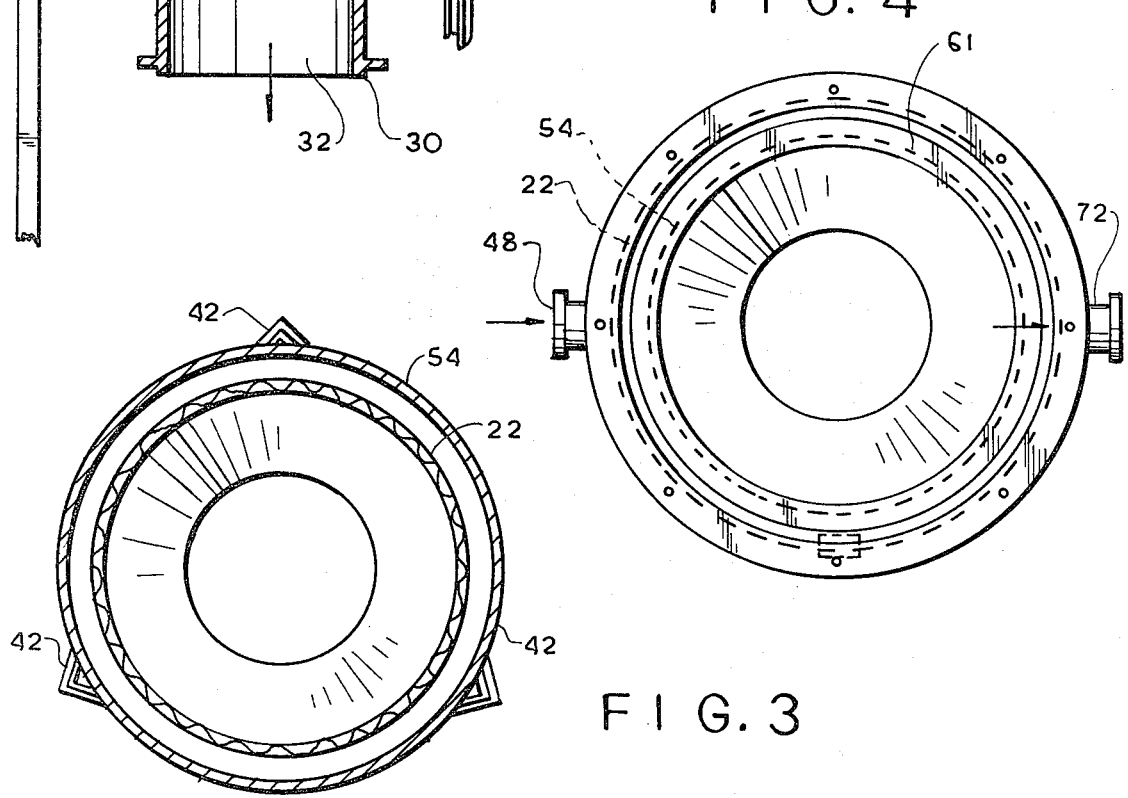
FIG. 4
FIG. 3

METHOD AND APPARATUS FOR FILTERING CONTAMINATING PARTICLES FROM A LIQUID/PARTICLE MIXTURE

BACKGROUND OF THE INVENTION

There are numerous industries today where it is desirable to filter contaminating particles from a liquid and particle mixture that has been produced during a manufacturing process. For example, in the papermaking industry it is often necessary to separate pulp fibers from water and other liquid chemicals. Similarly, in the textile industry, lint collected during the manufacturing process in water or other liquid utilized in the process must often be removed. There are a variety of reasons for the separation process. For example, it may be desirable to reuse the liquid portion of the mixture. Also, it may be desirable to collect the particle material for various additional manufacturing steps or reuse.

A conventional way of accomplishing the filtering operation is to utilize a vertical tank with an inlet at the top, an outlet intermediate the top and the bottom and a vertically mounted filter medium on the interior of the tank. Space is provided between the vertical filter and the inner wall of the tank and a drainage or dump opening is at the bottom of the tank. The drainage opening is normally closed during the filtering operation and is opened to periodically dump the collected particles. In operation of this type of system, the mixture of particles and liquid is introduced through the inlet opening into the vertical chamber formed between the outer wall of the filter and inner side wall of the tank. The mixture attempts to work its way through the filter to the central portion of the tank with the particles being filtered out and retained between the filter and the inner wall of the tank. Periodically, the tank is open and drained or dumped to rid the filtering structure of accumulated particles. In the meanwhile during operation, the liquid which is separated from the particles by the filter passes to an outlet for collection. The difficulty that arises with this type of a system is that the mixture engaging the filter surface is directed with such force against the mesh surface that the particles clog the apertures in the mesh. This initially makes the filter less efficient and ultimately precludes all further filtering action. At that point, the filter system must be opened and the filter removed and cleaned or replaced.

Attempts at increasing the velocity of the mixture entering the tank and engaging the filter surface have been unsuccessful in alleviating this problem. An opposite result occurs in that the particles are more tightly wedged or packed into the aperture of the filter. Lessening the velocity also has proved to be ineffectual. The result is that the particles still tend to congregate or migrate into one small area of the filter, for example, a portion of the narrow chamber between the filter and the inner wall of the tank, thereby clogging the filter and requiring that the filter be periodically removed and cleaned or replaced.

Thus, the shortcomings of existing filtering systems are readily apparent. The improvement of the present invention is a significant step forward in the art.

SUMMARY OF THE INVENTION

With the above background in mind, it is among the primary objectives of the present invention to provide an apparatus and method for filtering particles of material from a liquid/particle mixture employing a tank similar to that described above with a unique arrangement of modifications to eliminate the problem of clogging of the filter apertures and eliminating the necessity of frequent cleaning or replacement of the filters.

It is an objective of the present invention to provide a vertical concentric tank and filter arrangement whereby the tubular filter is spaced from the tubular inner side wall of the tank and is provided with a wide open top end. The inlet to the tank is positioned between the closed top of the tank and the upper edge of the filter. The space between the upper edge of the filter and the adjacent wall of the tank at least at the location of the inlet is closed. The outlet for the tank is positioned between the upper and lower ends of the filter and is spaced from the inlet, for example, below and at a diametrically opposite position. A drainage opening which is adapted to be closed for use of the apparatus and opened for dumping of the collected filtered particles is positioned at the bottom of the tank.

In operation, the relatively small inlet opening permits introduction of a mixture of particles and liquid into the tank at a position which is open to the much larger open area at the top of the tubular filter. Initially, and even after the tank is full of liquid and particles, the velocity of the incoming mixture through the small opening is diminished when the mixture encounters the large open area at the top of the filter thereby reducing the force with which the particles are directed into engagement with the filtering surface. The dispersion of the mixture of particles and liquids entering the tank over a wide area reduces the force at which the particles engage the apertures in the mesh and alleviates the danger of clogging of the mesh by the particles. The resultant turbulence and flow pattern causes liquid to be filtered through the apertures in the mesh while the particles are separated and collected for later dumping by opening of the drainage opening on the bottom of the tank. In the meantime, during operation, the filtered liquid passing through the apertures in the mesh exits through the outlet opening as separated liquid for collection and further use if desired.

It is an overall objective of the present invention to provide an improvement in existing filtering apparatus which does not materially add to existing costs of known systems and which more efficiently and effectively operates as a filtering mechanism for separating particles and liquid. Cost savings are apparent when one considers that shut-down time is minimized since the filter has to be infrequently replaced or removed to permit clogging and unclogging of the apertures. Also, the longevity of the parts is increased due to less frequent replacement of filters. A further improvement which assists in limiting down time of the apparatus in use of the machinery whether it be in the papermaking, textile or similar industries where particles and liquids are frequently separated is the provision of a shower arrangement extending into the tank. Periodically, the shower with a plurality of nozzles can be utilized to spray the interior of the tank and facilitate the collection of separated particles at the bottom of the tank for dumping. The particles are in a loosened condition and are easily washed and collected at the bottom of the tank. It is contemplated that a rotating shower conduit with a plurality of nozzles will work efficiently and effectively in cleaning the tank at given points in time during use.

In summary, a method and apparatus is provided for filtering contaminating particles from a liquid/particle mixture. The apparatus includes a hollow tank having a peripheral side wall and top and bottom ends. An inlet opening is in the wall adjacent the top and is adapted to be connected to a source of the liquid/particle mixture. An outlet opening is in the side wall spaced from the inlet opening and intermediate the top and bottom of the tank. A sealable drainage opening is in the tank. A filter is mounted in the tank essentially perpendicular to the inlet opening around a substantial portion of the periphery of the tank. The mounted filter is open at both ends and has filtering apertures in its side. The inlet opening is positioned so that the mixture is introduced into one open end of the filter. Filtered liquid from the mixture passes through the apertures in the side and through the outlet opening and collected particles can be dumped from the other open end through the drainage opening when it is unsealed. The tank and filter dimensions are predetermined so that the mixture from the fluid source passes through the inlet opening and into contact with the filter with a desired velocity and separation of the liquid and particles in the tank is efficiently accomplished without significant clogging of the filter apertures by particles during the filtering operation.

With the above objectives among others in mind, reference is made to the attached drawings.

BRIEF DESCRIPTION OF THE DRAWINGS

In the drawings:

FIG. 2 is a sectional side elevation view thereof taken along the plane of line 2—2 of FIG. 1;

FIG. 3 is a sectional top view thereof taken along the plane of line 3—3 of FIG. 1; and FIG. 4 is a sectional top view thereof taken along the plane of line 4—4 of FIG. 2.

DETAILED DESCRIPTION

Figure 1:
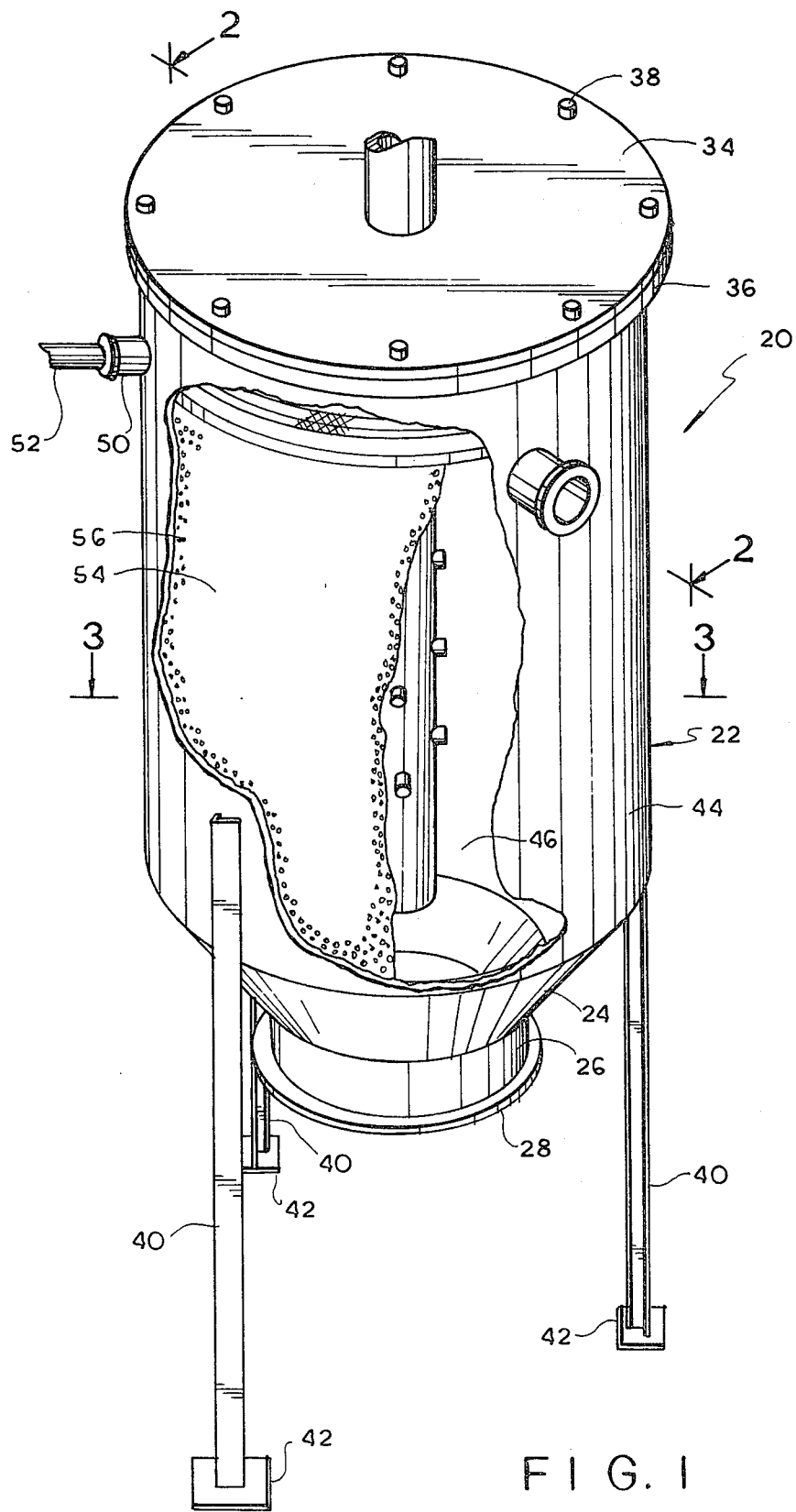
FIG. 1 is a perspective view of the apparatus of the invention with part of the side wall of the filtering tank broken away and removed.

Apparatus 20 as shown in the drawings is adapted for use as a lint filter in the textile industry or as a pulp filter in the papermaking industry. It is readily adaptable for use in similar industries where mixture of liquid and particles require mechanical separation. Apparatus 20 includes a tubular tank 22 which in the embodiment shown is substantially cylindrical with the exception of the lower portion which has a frustoconical part 24 tapering inward to a narrower diameter tubular portion 26 at the bottom end. Part 26 terminates at its lower end in a connecting flange 28 and a face ring 30 for interconnection and mounting to a receptacle system for dumping the particle contents of the tank 22 after use. The opening 32 in the bottom of tank 22 is normally closed and sealed by conventional apparatus used for that purpose in the industry in which apparatus 20 is employed. Opening 32 is unsealed and exposed in a conventional manner for dumping purposes to remove the particle contents of the tank 22 after the filtering operation is completed.

The upper end of tank 22 has its opening closed by a removable cover plate 34 which mates with an annular flange 36 on the upper edge of the tank. Appropriate mounting means such as bolts 38 can be employed to accomplish the attachment. Additionally, an appropriate gasket can be positioned between cover 34 and annular flange 36 to seal the upper end of the tank and prevent leakage. Tank 22 is vertically supported by an arrangement of three legs 40 resting on support feet 42. Each leg 40 is mounted to the tank 22 by conventional means such as welding or other convenient fastening methods. The number of legs is a matter of choice.

In this manner, tank 22 is held vertically and the major portion of its height is formed by a cylindrical side wall 44 surrounding an internal filtering chamber 46. The filtering chamber 46 communicates with the bottom opening 32 in the tank.

Adjacent to annular rim 36 at the upper end of the tank is an inlet opening 48 from which outwardly extends a tubular flanged connector 50. The connector 50 is adapted to be attached to a conduit 52 extending from a source of a liquid and particle mixture. In this manner, the mixture can be introduced into the interior 46 of the tank 22 through opening 48 at its upper end.

Mounted in vertical position in chamber 46 of tank 22 is a tubular filter or screen 54 with appropriate filtering apertures 56. The filter has an open upper end 58 and an open lower end 60. An annular flange 61 extends outwardly from the upper edge of the filter. The filter can be mounted in vertical position within chamber 46 in any convenient manner to retain it in fixed position.

In the embodiment shown, an annular inwardly extending projection 62 is located adjacent the upper end of the side wall 44 and a similar inwardly extending annular projection 64 is located near the bottom end of side wall 44. The outer diameter of the filter body 54 is less than the inner diameter of flanges 62 and 64. Annular flange 61 extending outwardly from the upper edge of the filter has a greater outer diameter than inside diameter of flange 62.

Filter 54 is introduced into the chamber 46 through the upper end of the tank 22 after removal of the cover plate 34. It will extend downward until the undersurface of flange 61 seats on the upper surface of flange 62 and the bottom edge 63 of the filter seats against the inner surface of the frustoconical wall portion 24 of the tank 22. At the same time, the outer surface of filter 54 seals against the inner edge of lower flange 64. Thus the bottom end of the filter is sealed at two points.

There are other convenient acceptable ways to mount the filter, for example, the length of the filter 54 can be made shorter and the sealing at the bottom accomplished by engagement with bottom flange 64 above. Also, the flange 64 can be made wider and the filter shorter so that bottom edge 63 of the filter seats on the upper surface of the flange 64 to seal the filter at the bottom end as it is mounted in tank 22.

The outer diameter of filter 54 is smaller than the inner diameter of wall 44. Thus an annular chamber 70 is located between the outer surface of the filter and the inner surface of wall 44. The upper end of chamber 70 is sealed by the interengagement between projection 62 and flange 61 and the bottom end of chamber 70 is sealed by interengagement between projection 64 and 54 and again between bottom edge 63 of filter 54 and the inner wall of portion 24 of tank 22. Entrance to chamber 70 is permitted through apertures 56 in filter 54. Exit from chamber 70 is achieved through opening 72 in side wall 44. The opening 72 is located below inlet opening 48 and below the top of filter 54. A tubular flanged connector 74 extends outwardly from the wall 44 for interconnection with appropriate conduit means or similar structure for removal of separated liquid from the mixture. In the depicted embodiment outlet opening 72 is angularly offset from and diametrically opposed to inlet opening 48. Alternatively, the outlet opening could be located in any angular position about the circumference of the tank even directly underneath the inlet opening as long as it is below the inlet opening.

A rotatable spray conduit or tube 76 extends vertically downward through an aperture 78 in cover plate 34. Appropriate clearance or bearings are provided in a conventional manner to permit tube 76 to rotate without interference with the cover plate 34. Tube 76 is connected to a source of washing fluid in a conventional manner (not shown) and the portion of tube 76 extending vertically downward into tank 22 substantially the entire height thereof is provided with a plurality of spaced nozzle orifices 80 through which washing fluid is sprayed for cleaning the interior of the tank 22 when desired. It has been found effective to employ a conventional manual or automatic rotating means to rotate the conduit 76 during the spraying operation to make a more efficient spray pattern as the washing liquid emerges from the nozzle orifice 78.

All of the component of the apparatus 20 with the exception of the filter 54 can be formed of a conventional material such as a metal, for example steel. The filter can also be chosen from a number of well known commercial products such as a plastic or stainless steel AES filter media manufactured by Albany Engineered Systems, a divisional of Albany International Company of Albany, New York. For example, an AES filter media of 140 microns, 100 mesh, square weave and of stainless steel material has been found to operate satisfactory.

In use, apparatus 20 is connected in an existing conventional industrial system such as a textile or paper-making process. Inlet opening 48 is connected to a source of liquid/particle mixture 52. Outlet opening 72 is connected to a collection conduit for separated liquid. Drainage opening 32 is interconnected with a dumping system for separated particles and is normally closed by components of that system as the filter is set up for use. Finally, spray conduit 76 is interconnected with an appropriate tube for introduction of washing fluid when needed. The filtering action is then begun.

The mixture of liquid and particles is introduced at a chosen velocity through aperture 48 into the upper end of tank 22. Chamber 70 between filter 54 and the inner wall of the tank is sealed and so the only direction for flow of the mixture is through the upper open end 58 into the interior of the filter. This rapid change in flow area between the narrower diameter inlet 48 and the wide opening 58 in the upper end of the filter causes rapid dispersion of the incoming mixture and greatly reduces the force of flow and accordingly the velocity of flow. Actually the resulting flow is one of swirling or turbulent action particularly as the chamber 46 in tank 22 fills the capacity and thereafter. The arrows in FIG. 2 show this flow action. In this manner, there is no direct contact of the mixture with the apertures 56 in the filter 54 with any significant force. Accordingly, the danger of clogging of the apertures by particles in the mixture is minimized and for all intents and purposes is eliminated. However, there is sufficient movement and turbulence for filtering action to occur. The liquid is free to pass through apertures 56 leaving the particles on the interior of the filter 54 and collecting toward the bottom of the tank 22. The separated liquids migrating into chamber 70 then collect and exit through outlet apertures 72 under the influence of hydraulic force as mixture is continuously introduced through inlet opening 48.

After a preselected period of time, dumping of collected particles through bottom drainage opening 32 is required. Accordingly, the opening 32 is unsealed and opened and the particles freely fall under the influence of gravity as shown by the arrows in FIG. 1 downwardly out of open end 32 into a collecting dump system.

Since there has been vertically no accumulation of particles in the apertures 56 in the filter, it is not necessary to remove the filter and replace it or remove any caked particles thereon. All that is required is a simple washing operation to remove any accumulated particles within filter 54 that have not yet fallen under the force of gravity through opening 32. This is accomplished by rotating spray conduit 76. Appropriate washing fluid of a conventional nature is sprayed through nozzle 78 as conduit 76 is manually or automatically rotated and washes the remaining collected particles from the filter down through drainage aperture 32.

Thereafter, the apparatus is ready for resumption of the filtering operation. All that is required is that the spray conduit 76 be shut off and drainage opening 32 resealed. Mixture of liquid and particles can then be introduced again through inlet 48 and the filtering operation is continued. In this manner, the dumping and cleaning procedure is quickly and efficiently carried out reducing the down time of the machinery and eliminating any disassembly or replacement of parts and thus adding to the overall efficiency and low cost nature of the filtering system.

An example of a filtering apparatus which will operate successfully in the above manner can be dimensionally constructed in the following manner. Filter 54 is chosen to be an AES filter media of 140 microns, 100 mesh and having a square weave of stainless steel material. Tank 22 is formed with a 30 inch diameter cylindrical majority wall portion 44 and having a height of $60\frac{1}{2}$ inches. Lower narrower diameter tubular part 26 is formed with a diameter of 16 inches and a height of 4 inches. The intermediate lower frustoconical part 24 is formed with a vertical height of 11 inches. Each leg 40 including base 42 is $69\frac{1}{2}$ inches high and the overall vertical height of the apparatus 20 is 109 inches. Inlet aperture 48 is 4 inches in diameter and the outlet aperture 72 is also 4 inches in diameter. The upper projection 62 on the interior of the tank is $16\frac{1}{4}$ inches below the upper end of wall 22. It is slightly below the bottom of inlet orifice 48. The annular projection 26 extends inwardly and terminates to form an opening of approximately 26 inches to the interior of filter 54. Bottom projection 64 extends inwardly approximately the same amount so that the inner diameter of filter 54 is approximately 26 inches as opposed to a diameter of wall portion 44 of 30 inches. Thus, chamber 70 is approximately 4 inches wide. Finally, spray conduit 76 has a diameter of approximately 1 inch for facilitating introduction of the washing fluid. The center line of the inlet opening 48 is approximately $14\frac{1}{4}$ inches from the upper end of tank 22 while the center line of outlet opening 72 is approximately $19\frac{1}{2}$ inches below the upper end of the tank. As stated, the projection 62 is $16\frac{1}{4}$ inches below the upper end of the tank. This provides for the inlet opening to be just above the upper end of the filter and the outlet opening to be just below the upper end of the filter when the apparatus 20 is in use.

Thus the several aforesaid objects and advantages are most effectively attained. Although several somewhat preferred embodiments have been disclosed and described in detail herein, it should be understood that this invention is in no sense limited thereby and its scope is to be determined by that of the appended claims.

I claim:

1. An apparatus for filtering contaminating particles of solid material from a liquid/particle mixture comprising; a hollow tank having a peripheral side wall and top and bottom ends, an inlet opening in the wall adjacent the top adapted to be connected to a source of a liquid/particle mixture, an outlet opening in the side wall spaced from the inlet opening and intermediate the top and bottom of the tank, a sealable drainage opening in the tank, a filter in the tank and having small filtering apertures, the filter being mounted in essentially a vertical position with its upper end just below the inlet opening and perpendicular thereto, the outlet opening being located intermediate the ends of the filter, the drainage opening being at the lower end of the tank and the filter being spaced from the inner peripheral side wall of the tank, the filter extending around a substantial portion of the inner peripheral surface of the tank, the filter being open at both its upper and lower ends and the filtering apertures in its side wall, the inlet opening being positioned so that the mixture is introduced into the open upper end of the filter and filtered liquid from the mixture will pass through the apertures in the side wall of the filter and through the outlet opening and collected particles can be dumped from the lower open end of the filter through the drainage opening when it is unsealed, the open upper end of the filter having a substantially larger diameter than the diameter of an inlet opening and the apertures in the filter being considerably smaller than the inlet opening, and the ratio of sizes of the apertures in the filter, the open upper end of the filter, and the inlet opening being selected so that when the liquid/particle mixture is introduced at a predetermined velocity through the inlet opening it will enter the open upper end of the filter and be dispersed and brought into contact with the filter side wall with a desired low flow velocity per square inch of filter area and separation of the liquid and particles in the tank is effectively accomplished without significant clogging of the filter apertures by particles during the filtering operation, a shower conduit extending through the upper end of the tank, a plurality of nozzle orifices in the portion of the shower conduit extending into the interior of the tank, and the shower adapted to be connected to a source of washing fluid so that when washing fluid is introduced into the tank through the nozzle orifices in the shower conduit and the drainage opening is unsealed it will facilitate the washing of the collected particles on the interior of the filter out through the drainage opening.

2. The invention in accordance with claim 1 wherein the side wall of the tank is cylindrical in configuration, the upper end of the tank is closed and the drainage opening is in the bottom of the tank, and the filter being cylindrical in configuration and concentrically spaced inward from the inner surface of the cylindrical side wall of the tank around the entire circumference thereof.

3. The invention in accordance with claim 2 wherein the outlet opening is diametrically opposed to the inlet opening in the side wall of the tank.

4. The invention in accordance with claim 2 wherein the tank includes a bottom end section having a frustoconical upper part communicating with a tubular lower part of substantially narrower diameter than the remaining side wall of the tank, and the drainage opening forming an opened lower end of the narrower diameter tubular part.

5. The invention in accordance with claim 1 wherein the filter is retained in position by an inwardly extending annular shoulder and an inwardly extending wall portion of the tank, a flange on the upper end of the filter abutting the upper surface of the annular shoulder and the lower end of the filter abutting the inwardly extending wall portion and the abutting surfaces of the filter and tank sealing the chamber between the filter side wall and the adjacent side wall of the tank.

6. The invention in accordance with claim 1 wherein the apparatus is interconnected with textile machinery and filters lint.

7. The invention in accordance with claim 1 wherein the apparatus is interconnected with papermaking machinery and filters pulp.

8. A method for filtering contaminating particles of solid material from a liquid/particle mixture comprising; introducing a liquid/particle mixture into a hollow tank having a peripheral side wall and top and bottom ends through an inlet opening in the wall adjacent the top, filtering the particles from the mixture by use of a filter in the tank disposed essentially vertically and perpendicular to the inlet opening and extending around a substantial portion of the peripheral side wall of the tank, removing the filtered fluid collected from the mixture through an outlet opening in the side wall of the tank spaced from the inlet opening and intermediate the top and bottom of the tank, removing the filtered contaminated particles through a sealable drainage opening in the tank when the drainage opening is unsealed, providing apertures in the filter that are considerably smaller than the inlet opening and the inlet opening being of a substantially smaller diameter than the open upper end of the filter and the ratio of the apertures in the filter, the open upper end of the filter and the inlet opening being selected so that when a liquid/particle mixture is introduced at a predetermined velocity through the inlet opening it will enter the open upper end of the filter and be dispersed and brought into contact with the filter at a low flow velocity per square inch of filter area so that separation of the liquid and contaminated particles in the tank is effectively accomplished without significant clogging of the filter apertures by particles during the filtering operation, and periodically washing the interior of the filter by using a rotating shower conduit extending through the upper end of the tank, a plurality of nozzle orifices in the portion of the shower conduit extending into the interior of the tank, and the shower conduit adapted to be connected to a source of washing fluid so that when washing fluid is introduced into the tank through the nozzle orifices in the shower conduit and the drainage opening is unsealed it will facilitate the washing of the collected particles on the interior of the filter out through the drainage opening.

9. The invention in accordance with claim 8 wherein the side wall of the tank is cylindrical in configuration, the upper end of the tank is closed and the drainage opening is in the bottom of the tank, and the filter being cylindrical in configuration and concentrically spaced inward from the inner surface of the cylindrical side wall of the tank around the entire circumference thereof.

10. The invention in accordance with claim 9 wherein the outlet opening is diametrically opposed to the inlet opening in the side wall of the tank.

11. The invention in accordance with claim 9 wherein the tank includes a bottom end section having a frusto-conical upper part communicating with a tubular lower part of substantially narrower diameter than the remaining side wall of the tank, and the drainage opening forming an opened lower end of the narrower diameter tubular part.

12. The invention in accordance with claim 8 wherein the filter is retained in position by an inwardly extending annular shoulder and an inwardly extending wall portion of the tank, a flange on the upper end of the filter abutting the upper surface of the annular shoulder and the lower end of the filter abutting the inwardly extending wall portion and the abutting surfaces of the filter and tank sealing the chamber between the filter side wall and the adjacent side wall of the tank.

13. The invention in accordance with claim 8 wherein the tank is interconnected with textile machinery and filters lint.

14. The invention in accordance with claim 8 wherein the tank is interconnected with papermaking machinery and filters pulp.

* * * * *